United States Patent
Quigley et al.

(10) Patent No.: US 8,194,756 B2
(45) Date of Patent: Jun. 5, 2012

(54) USING PROGRAM CLOCK REFERENCES TO ASSIST IN TRANSPORT OF VIDEO STREAM TO WIRELESS DEVICE

(75) Inventors: Thomas J. Quigley, Franklin, NC (US); Jeyhan Karaoguz, Irvine, CA (US); Sherman (Xuemin) Chen, San Diego, CA (US); Michael Dove, Los Gatos, CA (US); David Rosmann, Irvine, CA (US); Stephen E. Gordon, Lexington, MA (US)

(73) Assignee: Broadcom Corporation, Irvine, CA (US)

( * ) Notice: Subject to any disclaimer, the term of this patent is extended or adjusted under 35 U.S.C. 154(b) by 960 days.

(21) Appl. No.: 12/189,716

(22) Filed: Aug. 11, 2008

(65) Prior Publication Data

US 2009/0296828 A1   Dec. 3, 2009

Related U.S. Application Data

(60) Provisional application No. 61/056,682, filed on May 28, 2008.

(51) Int. Cl.
  *H04N 11/02* (2006.01)
(52) U.S. Cl. ......... 375/240.26; 375/240.24; 375/240.25; 375/240.27; 375/240.28; 348/445; 348/565; 348/584
(58) Field of Classification Search ............... 375/240, 375/240.17, 240.24, 240.25, 240.26, 240.27, 375/240.28; 348/445, 565, 584
  See application file for complete search history.

(56) References Cited

U.S. PATENT DOCUMENTS

| | | | | |
|---|---|---|---|---|
| 5,473,385 A * | 12/1995 | Leske | .................... | 375/240.26 |
| 5,533,021 A * | 7/1996 | Branstad et al. | .............. | 370/396 |
| 5,652,749 A * | 7/1997 | Davenport et al. | .......... | 370/466 |
| 5,901,149 A * | 5/1999 | Itakura et al. | ................. | 370/468 |
| 5,918,002 A * | 6/1999 | Klemets et al. | ................. | 714/18 |
| 5,966,387 A * | 10/1999 | Cloutier | ...................... | 370/516 |
| 6,085,221 A * | 7/2000 | Graf | ............................. | 709/202 |
| 6,269,078 B1 * | 7/2001 | Lakshman et al. | ............. | 370/230 |
| 6,404,818 B1 * | 6/2002 | Obikane | .................. | 375/240.28 |
| 6,741,290 B1 * | 5/2004 | Wells | ............................ | 348/512 |
| 7,389,318 B2 * | 6/2008 | Yoshida et al. | ............... | 709/200 |
| 7,421,048 B2 * | 9/2008 | Ducharme et al. | ............ | 375/354 |
| 7,813,619 B2 * | 10/2010 | Takeda et al. | ................. | 386/248 |
| 7,877,439 B2 * | 1/2011 | Gallou et al. | ................. | 709/203 |
| 7,877,514 B2 * | 1/2011 | Shao et al. | ..................... | 709/245 |
| 7,885,270 B2 * | 2/2011 | Frink et al. | ................. | 370/395.4 |
| 7,936,819 B2 * | 5/2011 | Craig et al. | ............. | 375/240.12 |
| 2002/0136335 A1 * | 9/2002 | Liou et al. | ..................... | 375/354 |
| 2004/0109519 A1 * | 6/2004 | Mizukami et al. | ............ | 375/362 |
| 2005/0050424 A1 * | 3/2005 | Matsuura | ....................... | 714/748 |
| 2005/0111470 A1 * | 5/2005 | Memarzadeh et al. | ....... | 370/412 |
| 2007/0140398 A1 * | 6/2007 | Inoue et al. | .................... | 375/372 |
| 2008/0019398 A1 * | 1/2008 | Genossar et al. | ............ | 370/498 |
| 2008/0186850 A1 * | 8/2008 | Lee et al. | ....................... | 370/232 |
| 2008/0313692 A1 * | 12/2008 | Yun et al. | ....................... | 725/131 |
| 2009/0180534 A1 * | 7/2009 | Hluchyj et al. | .......... | 375/240.01 |

* cited by examiner

*Primary Examiner* — Ayaz Sheikh
*Assistant Examiner* — Andrew C Lee
(74) *Attorney, Agent, or Firm* — Garlick & Markison

(57) ABSTRACT

Processing a video stream using upon Program Clock References (PCRs) contained therein in preparation for transmission to a wireless device. Operation includes receiving video frames of the video stream, buffering the video frames, and extracting PCRs from at least some of the video frames of the video stream. Operation further includes, based upon at least the values of the PCRs, determining transmission parameters, and transmitting video frames of the video stream to the wireless device according to the transmission parameters. Operation may further include determining a round trip delay of transmissions to the wireless device and acknowledgements from the wireless device, adjusting PCRs of at least some video frames of the video stream based upon the round trip delay, and transmitting the video frames of the video stream to the wireless device.

14 Claims, 7 Drawing Sheets

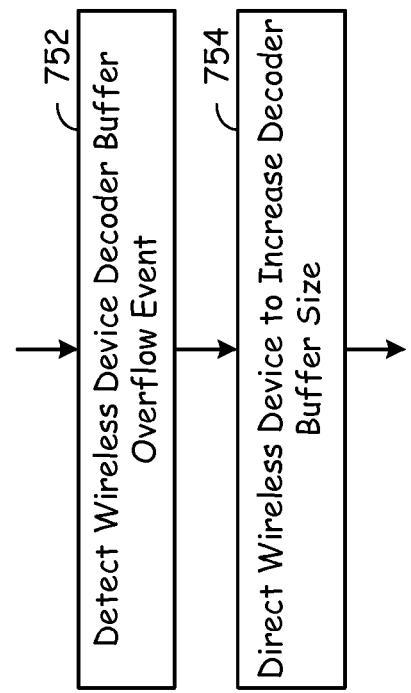
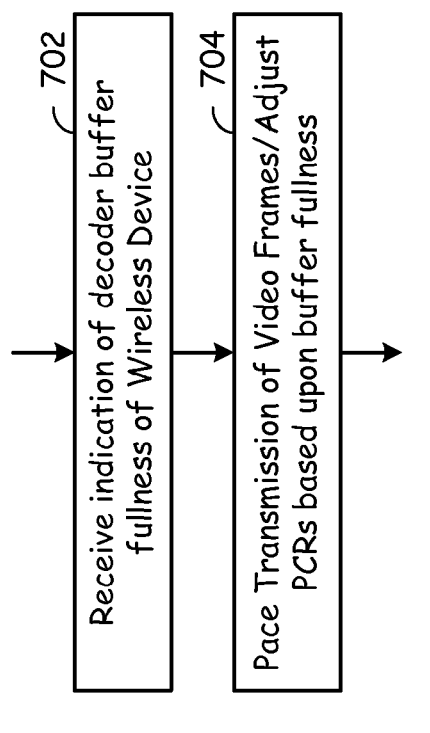

USING PROGRAM CLOCK REFERENCES TO ASSIST IN TRANSPORT OF VIDEO STREAM TO WIRELESS DEVICE

CROSS-REFERENCE TO RELATED APPLICATION

The present application claims priority under 35 U.S.C. 119(e) to provisional patent application Ser. No. 61/056,682, filed May 28, 2008, which is incorporated herein by reference in its entirety.

BACKGROUND

1. Technical Field of the Invention

This invention relates generally to multimedia content transport, and more particularly to the preparation for transport and transport of such multimedia content.

2. Related Art

The broadcast of digitized audio/video information (multimedia content) is well known. Limited access communication networks such as cable television systems, satellite television systems, and direct broadcast television systems support delivery of digitized multimedia content via controlled transport medium. In the case of a cable modem system, a dedicated network that includes cable modem plant is carefully controlled by the cable system provider to ensure that the multimedia content is robustly delivered to subscribers' receivers. Likewise, with satellite television systems, dedicated wireless spectrum robustly carries the multi-media content to subscribers' receivers. Further, in direct broadcast television systems such as High Definition (HD) broadcast systems, dedicated wireless spectrum robustly delivers the multi-media content from a transmitting tower to receiving devices. Robust delivery, resulting in timely receipt of the multimedia content by a receiving device is critical for the quality of delivered video and audio.

Some of these limited access communication networks now support on-demand programming in which multimedia content is directed to one, or a relatively few number of receiving devices. The number of on-demand programs that can be serviced by each of these types of systems depends upon, among other things, the availability of data throughput between a multimedia source device and the one or more receiving devices. Generally, this on-demand programming is initiated by one or more subscribers and serviced only upon initiation.

Publicly accessible communication networks, e.g., Local Area Networks (LANs), Wireless Local Area Networks (WLANs), Wide Area Networks (WANs), Wireless Wide Area Networks (WWANs), and cellular telephone networks, have evolved to the point where they now are capable of providing data rates sufficient to service streamed multimedia content. The format of the streamed multimedia content is similar/same as that that is serviced by the limited access networks, e.g., cable networks, satellite networks. However, each of these communication networks is shared by many users that compete for available data throughput. Resultantly, data packets carrying the streamed multimedia content are typically not given preferential treatment by these networks.

Generally, streamed multimedia content is formed/created by a first electronic device, e.g., web server, transmitted across one or more commutation networks, and received and processed by a second electronic device, e.g., Internet Protocol (IP) television, personal computer, laptop computer, cellular telephone, WLAN device, or WWAN device. In creating the multimedia content, the first electronic device obtains/retrieves multimedia content from a video camera or from a storage device, for example, and encodes the multimedia content to create encoded audio and video frames according to a standard format, e.g., MPEG-2 format. The audio and video frames are placed into data packets that are sequentially transmitted from the first electronic device onto a servicing communication network, the data packets addressed to one or more second electronic device(s). One or more communication networks carry the data packets to the second electronic device. The second electronic device receives the data packets, reorders the data packets, if required, and extracts the audio and video frames from the data packets. A decoder of the second electronic device receives the data packets and reconstructs a program clock based upon Program Clock References (PCRs) contained in the transport packets. The decoder then uses the reconstructed clock to decode the audio and video frames to produce audio and video data. The second electronic device then stores the video/audio data and/or presents the video/audio data to a user via a user interface.

To be compliant to the MPEG-2 Systems specification, PCRs are required to be inserted at least every 100 milliseconds in a MPEG-2 transport stream. In order for the second electronic device to accurately reconstruct the program clock, e.g., at 27 MHz, incoming transport packets must arrive at the decoder of the second electronic device with jitter that is less than approximately 1-2 milliseconds/30 parts-per-million (PPM). Data packets that are transported by communication networks such as the Internet, WANs, LANs, WWANs, WLANs, and/or cellular networks, for example, using IP addressing, for example, may travel via differing routes across one or more communication networks and arrive with various transmission latencies. In many operations, the data packets carrying timestamps arrive with significant jitter, sometimes approaching 200-400 parts-per-million jitter. With this large jitter, the receiving decoder may be unable to recreate the program clock from the received data packets.

Further, even if the decoder is able to recreate the program clock, the recreated program clock may have a significantly different frequency than the program clock of the encoding first device. Such differences in the recreated program clock of the decoder of the second electronic device as compared to the program clock of the encoder of the first electronic device results in buffer overflow or underflow at the second electronic device. Buffer overflow causes some of the incoming data to be purged and not buffered resulting in lost data and poor audio or video quality. Buffer underflow causes starvation of the decoder also resulting in poor audio or video quality. Further, even though the jitter in the transport stream may be relatively low, latency of transport may vary over time. Such is often the case with wireless networks that transport streamed multimedia content. In such cases, even though a program clock may be reconstructed from the PCRs that are received, data buffer underflow/overflow may also occur.

Thus, a need exists for a streamed transport system that operates satisfactorily with a high jitter transport stream, e.g. the Internet, and that produces video and audio output of high quality. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE INVENTION

FIG. 7A is a flow chart illustrating operations for pacing transport of video frames based upon a wireless device decoder buffer fullness according to one or more embodiments of the present invention; and FIG. 7B is a flow chart illustrating operations for directing a wireless device to alter the size of its decoder buffer according to one or more embodiments of the present invention.

DETAILED DESCRIPTION OF THE INVENTION

Generally according to the present invention various methodologies and structures are disclosed that process video frames of a video stream prior to their transport to a destination device. These video frames may carry just video data or may carry both audio and video data. Operations according to the present invention are described herein with reference to FIGS. 1, 2, 6, and 7. Structures that embody the teachings of the present invention are illustrated further with reference to FIGS. 3-5.

Generally, as is known, video frames of a video stream are formed by an encoding device and transported to a destination device. According to the present invention, the destination device may be a wireless device serviced by one or more wireless links. The wireless link(s) servicing transport of the video stream may have limited data throughput, may have jitter introduced thereby, and may vary from the prospective of throughput and jitter over time. Thus, according to the present invention, embodiments of the present invention use program clock references (PCRs) to assist in determining how best to transport the video frames of the video stream. According to other aspects of the present invention, the PCRs themselves are modified in response to then supported transport characteristic of one or more servicing networks. For example, PCRs may be modified based upon a latency of a servicing wireless network that changes over time. A better understanding of the principles of the present invention will be had via subsequent descriptions relating to FIGS. 1-7.

Figure 1:
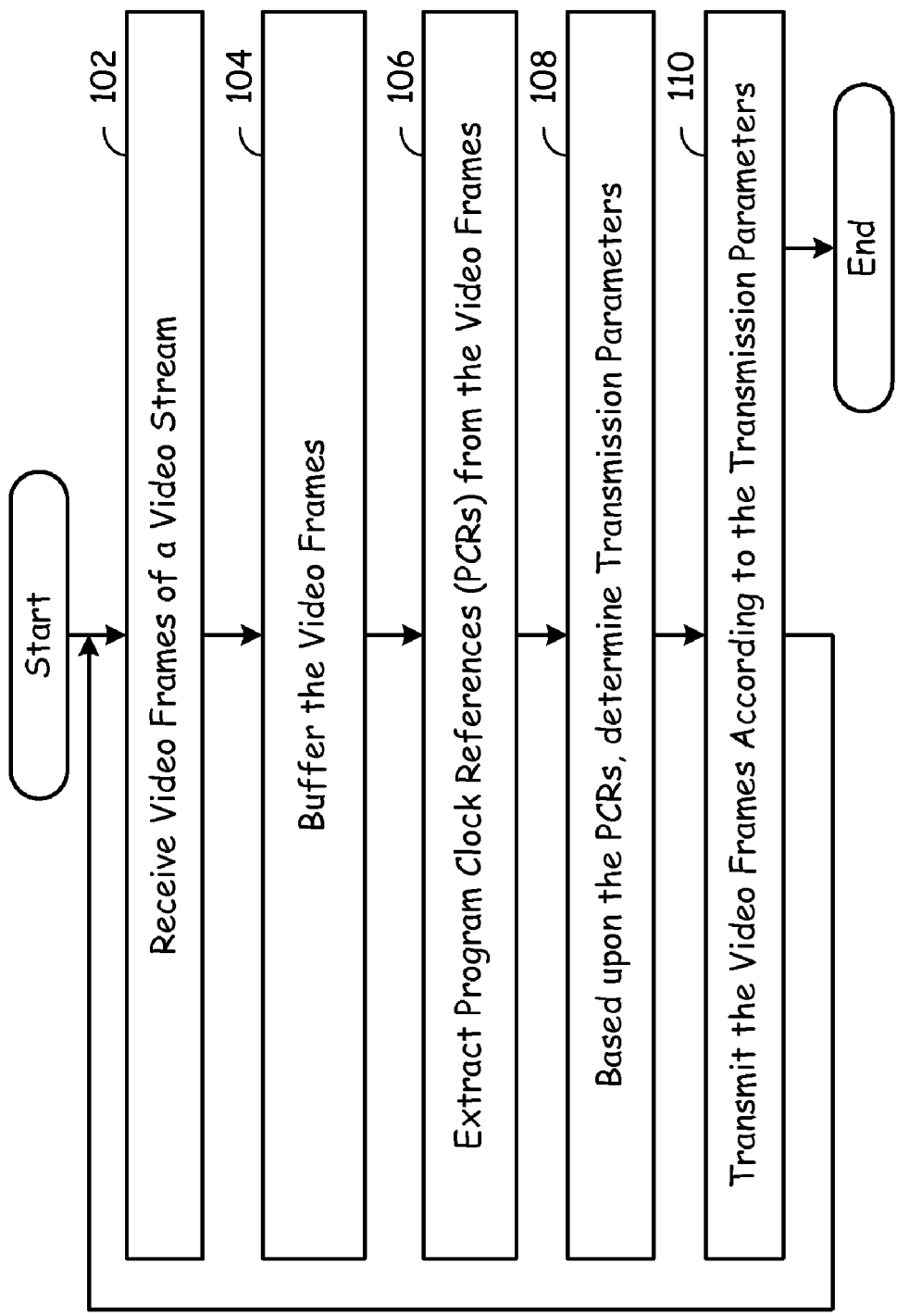
FIG. 1 is a flow chart illustrating a method for operating upon a video stream using Program Clock References (PCRs) according to one or more embodiments of the present invention.

FIG. 1 is a flow chart illustrating a method for operating upon a video stream using Program Clock References (PCRs) according to one or more embodiments of the present invention. The operations 100 of FIG. 1 process video frames of a video stream using PCRs contained therein in preparation for transmission of the video frames to a wireless device. The operations 100 of FIG. 1 include first receiving video frames of the video stream (Step 102). As will be described further with reference to FIG. 3, a video processing system receives the video frames of the video stream at Step 102 via a communications interface. The operations 100 of FIG. 1 continue with buffering the video frames (Step 104). Then, the operations 100 include extracting PCRs from at least some of the video frames of the video stream (Step 106). Because not all of the video frames of the video streams include PCRs, only a portion of the buffered video frames may be operated upon to extract PCRs contained therein.

Next, the operations 100 of FIG. 1 include, based upon the PCRs extracted at Step 106, determining transmission parameters for the video stream (Step 108). Generally, the PCRs provide an indication of the data throughput requirement of the video stream. For example, a fast moving image that is represented by the video stream may have a relatively greater video frame frequency than does a slow moving sequence of images carried by the video frames. Thus, by analyzing the PCRs extracted at Step 106 and by other information such as a video frame frequency, for example, the operations of Step 108 may determine transmission parameters required for the transport of the video frames to the remote wireless device.

Then, based upon the operations at Step 108 that determine transmission parameters, operations 100 include transmitting the video frames according to the transmission parameters (Step 110). Particular embodiments of transmission parameters will be described further herein with reference to FIGS. 6 and 7. Generally, the transmission parameters may include the manner in which video frames are grouped for transmission to the wireless device. Further, transmission parameters may include the allocation of wireless system throughput to service the video stream. For example, when the PCRs of the video frames of the video stream indicate that a greater data throughput is required, the operation of Step 110 would include ensuring that sufficient throughput exists to service the video stream at each time frame. As the reader should appreciate, the characteristics of a video stream may change over time based upon the video content that is being carried. Thus, the operations 100 of FIG. 1 compensate for the differing characteristics of the video stream over time based upon analysis of PCRs contained within at least some of the video frames of the video stream. Operations at Step 110 may include altering transmission parameters over time to adequately service the video stream without over burdening the wireless networks servicing transport of the video stream to the remote wireless device.

Figure 2:
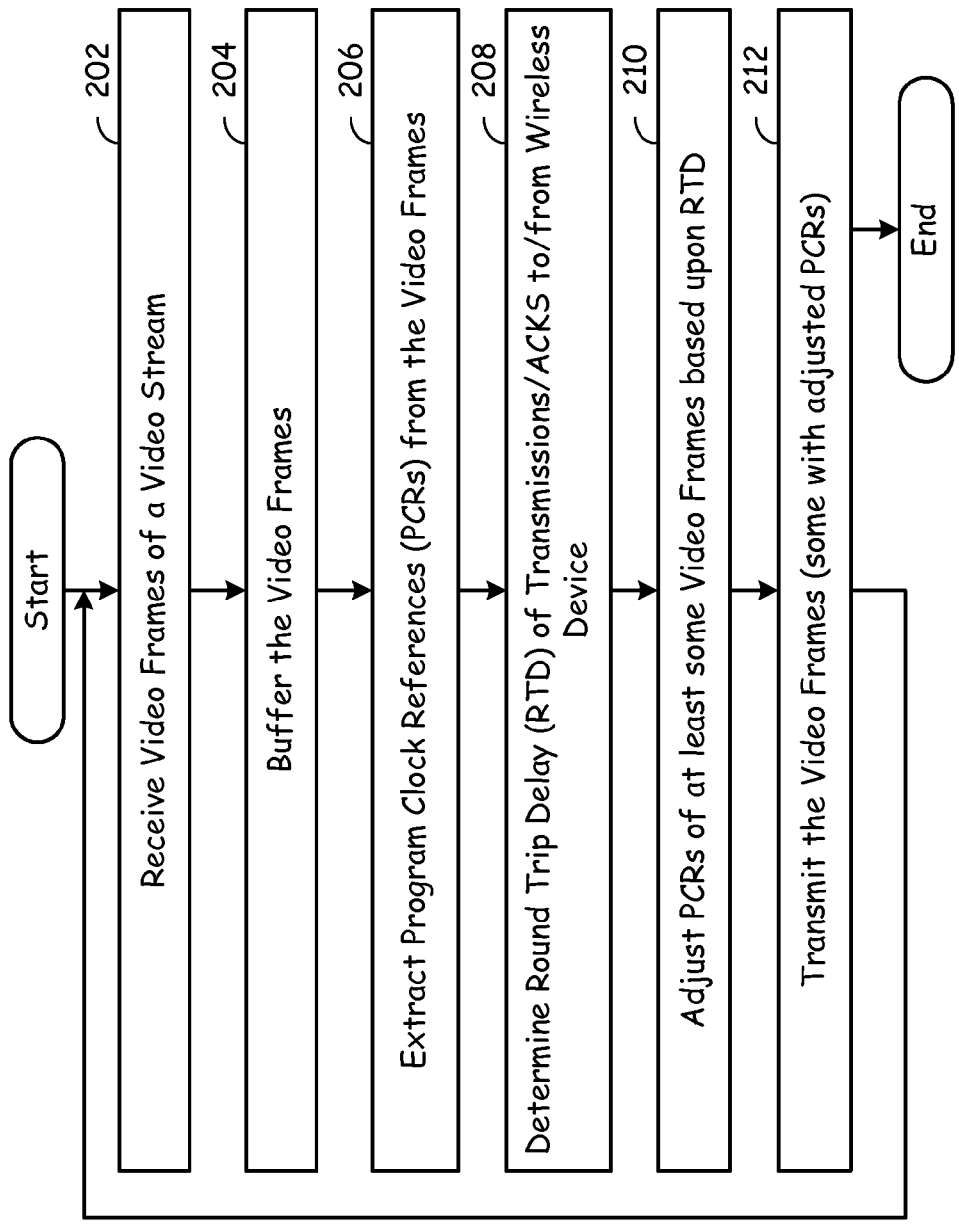
FIG. 2 is a flow chart illustrating a method for operating upon a video stream using PCRs according to one or more other embodiments of the present invention.

FIG. 2 is a flow chart illustrating a method for operating upon a video stream using PCRs according to one or more other embodiments of the present invention. The operations 200 of FIG. 2 include first receiving video frames of a video stream (Step 202). The operations 200 of FIG. 2 may be accomplished by a video processing system such as one of the video processing systems described further herein with reference to FIGS. 3-5. Operation 200 continues with buffering the video frames (Step 204). Buffering the video streams by the video processing system at Step 204 include storing the video frames in memory (or a video frame buffer) such that they can be accessed for subsequent transport to the remote wireless device.

Operations 200 continue with extracting PCRs from at least some of the video frames of the video stream (Step 206). Then, operation 200 continues with determining a roundtrip delay of transmissions to the wireless device in acknowledgments from the wireless device (Step 208). Using a reception verified protocol such as the Transmission Control Protocol (TCP), for example, for each data packet transmitted by a transmitting device to a remote wireless device, the transmitting device expects an acknowledgment from the remote wireless device. Such acknowledgment will either cause retransmission of the same data packet or will notify the transmitting device that the data packet has been successfully received without error. The overall time period of the transmission and acknowledgment process is often referred to as the Round Trip Delay (RTD). The RTD of the transmission/acknowledgment process will vary over time based upon latency within not only the wireless network servicing the remote wireless device but also based upon a variable delay introduced by a wired or optical network also servicing transmissions to the remote wireless device and acknowledgements received there from. The RTD may be characterized as instantaneous, average over time, weighted average over time, or by another characterization.

The operations 200 of FIG. 2 continue with adjusting the PCRs of at least some of the video frames based upon the RTD determined at Step 208 (Step 210). Adjustment of the PCRs may also be based upon frame frequency, frame data size, and/or other information collected by the video processing system regarding the video stream. By adjusting the PCRs of at least some of the video streams in response to a current RTD determined at Step 208, the video stream may be adjusted to prevent or preclude decoding errors at the remote wireless device. Then, operations 200 continue with transmitting the video frames of the video stream (some with adjusted PCRs) to the remote wireless device (Step 212). As was the case with the operations of FIG. 1, the operations 200 of FIG. 2 may be performed throughout the duration of the transport of the video stream to the remote wireless device. In such case, the RTD of the transmission/acknowledgment process will vary with time. Resultantly, adjustment of PCRs that is performed based upon the RTD may also vary over time. As was the case with the operations 100 of FIG. 1, the operations 200 of FIG. 2 may include adjusting transmission parameters based upon the PCRs. Further, with the operations 200 of FIG. 2, the transmission parameters may also be adjusted based upon the RTD measured at Step 208. For example, if the RTD is unacceptable for support of transport of the video stream to the remote wireless device, transmission parameters to increase throughput may be enacted.

Figure 3:
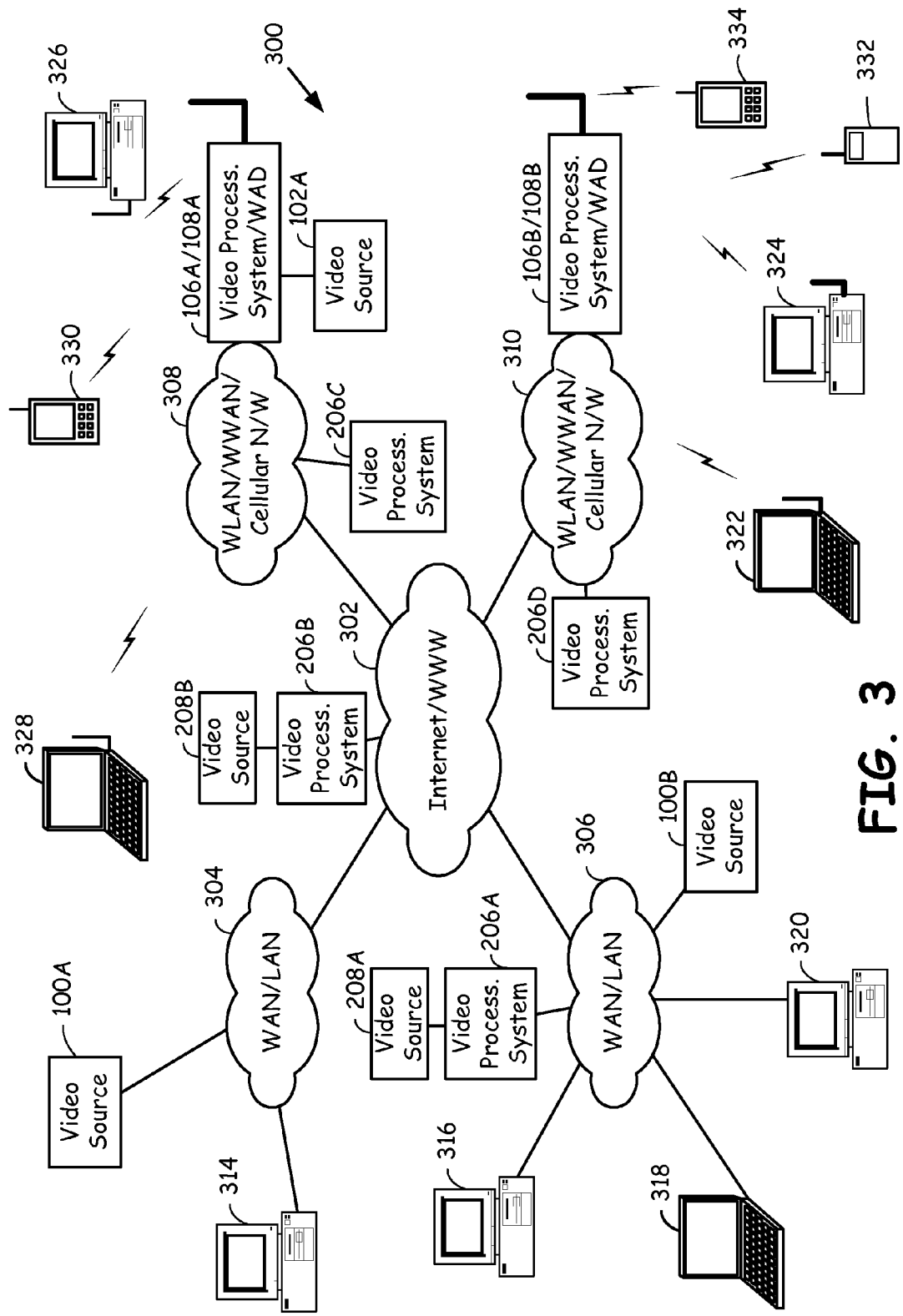
FIG. 3 is a system diagram illustrating a communication system that operates according to one or more embodiment of the present invention.

FIG. 3 is a system diagram illustrating a communication system that operates according to one or more embodiment of the present invention. The system 300 of FIG. 3 includes a plurality of communication networks 302, 304, 306, 308, and 310 that service a plurality of electronic devices 314, 316, 318, 320, 322, 324, 326, 328, 330, 332, and 334. These communication networks include the Internet/World Wide Web (WWW) 302, one or more Wide Area Networks/Local Area Networks (WANs/LANs) 304 and 306, and one or more Wireless Wide Area Networks/Wireless Local Area Networks/Cellular networks (WLANs/WWANs/Cellular networks) 308 and 310. The Internet/WWW 302 is generally known and supports Internet Protocol (IP) operations. The WANs/LANs 304 and 306 support electronic devices 314, 316, 318, and 320 and support IP operations. The WLANs/WWANs/Cellular networks 308 and 310 support wireless devices 322, 324, 326, 328, 330, 332, and 334.

The WLAN/WWAN/Cellular networks 308 and 310 operate according to one or more wireless interface standards, e.g., IEEE 802.11x, WiMAX, GSM, EDGE, GPRS, WCDMA, CDMA, 3xEV-DO, 3xEV-DV, etc. The WLAN/WWAN/Cellular networks 308 and 310 include a back-haul network that couples to the Internet/WWW 302 and service wireless links for wireless devices 322, 324, 326, 328, 330, 332, and 334. In providing this wireless service, the WLAN/WWAN/Cellular networks 308 and 310 include infrastructure devices, e.g., Access Points and base stations to wirelessly service the electronic devices 322, 324, 326, 328, 330, 332, and 334. The wireless links serviced by the WLAN/WWAN/Cellular networks 308 and 310 are shared amongst the wireless devices 324-334 and are generally data throughput limited. Such data throughput limitations result because the wireless links are shared, the wireless links are degraded by operating conditions, and/or simply because the wireless links have basic data throughput limitations.

According to operations of the system 300 of FIG. 3, any of the devices 314, 316, or 328, any of the video sources 100A, 100B, 102A, 208A, and/or 208B, and/or any of the video processing systems 106A, 106B, 206A, 206B, 206C, or 206D may operate as a video processing system according to the operations described with reference to FIGS. 1 and 2 and as will be further described with reference to FIG. 3 and FIGS. 6-7. Further each of the wireless devices 322, 324, 326, 328, 330, 332, of 334 may serve and operate as a remote wireless device as was described with reference to FIGS. 1 and 2 and as will be further described with reference to FIGS. 4 and 6-7. Note that with the embodiments of FIG. 3, video processing system 106A and wireless access device 108A are shown as a single block and video processing system 106B and wireless access device 108B are shown as a single block. This indicated structure does not necessarily indicate that these devices share a physical structure, only that they are coupled functionally at the edge of networks 308 and 310, respectively.

Figure 4:
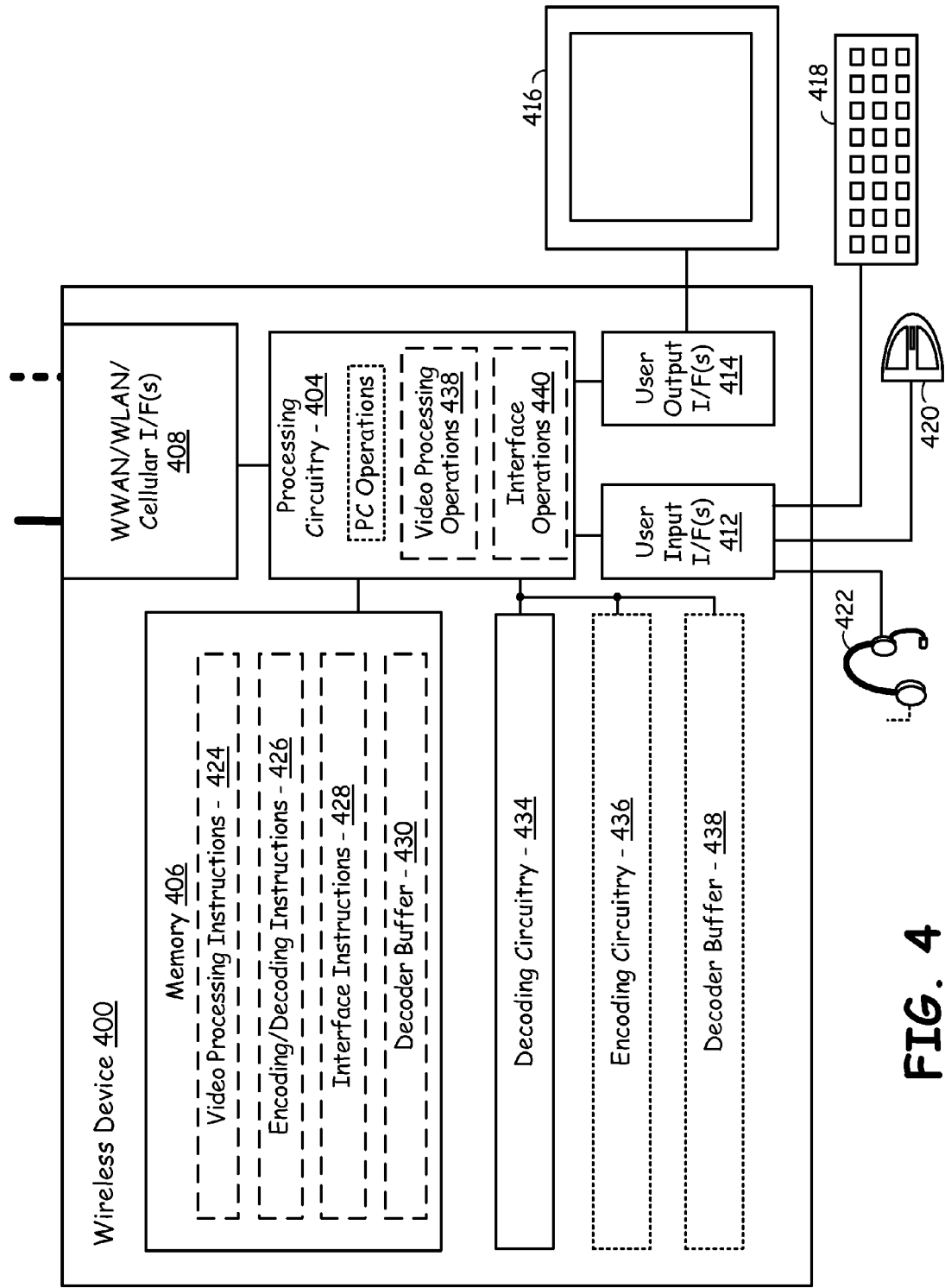
FIG. 4 is a block diagram illustrating a wireless device constructed and operating according to one or more embodiments of the present invention.

FIG. 4 is a block diagram illustrating a wireless device constructed and operating according to one or more embodiments of the present invention. The wireless device 400 is representative of an embodiment of one or more of the wireless devices 322, 324, 326, 328, 330, 332, of 334 of FIG. 3, for example. The components of wireless device 400 are generically illustrated. Particular embodiments of the wireless device 400 of FIG. 4 may include some, most, or all of the components that are illustrated in FIG. 4.

Generally, the wireless device 400 includes processing circuitry 404, memory 406, wireless network interface 408, user input interfaces 412, and user output interfaces 414. The user input interfaces 412 couple to headset 422, mouse 420, and keyboard 418. The user output interfaces 414 couple to audio/video display device 416. The user output interface 414 may also couple to headphone 422. The display device 416 may include a monitor, projector, speakers, and other components that are used to present the audio and video output to a user. While these components of the wireless device are shown to be physically separate, all of these components could be housed in a single enclosure, such as that of a handheld device. The wireless device 400 embodies the structure and performs operations of the present invention with respect to video stream receipt and processing and information feedback, e.g., decoder buffer fullness information, ARQ generation, etc. Thus, the wireless terminal operates consistently with the operations and structures previously described with reference to FIGS. 1-3 and as will be described further with reference to FIGS. 6-7.

In one particular construct of the wireless device 400, dedicated hardware is employed for video processing, e.g., audio and/or video encoding and/or decoding operations. In such case, the wireless device 400 includes decoding circuitry 434, encoding circuitry 436, and a decoder buffer 438. Alternatively, the wireless device 400 services video processing and feedback operations using non-dedicated resources. In such case, these operations of wireless device 400 are serviced by processing circuitry 404. The processing circuitry 404 performs, in addition to its PC operations, video processing operations 438, and interface operations 440. In such case, particular hardware may be included in the processing circuitry 404 to perform the operations 438 and 440. Alternatively, video processing operations 438 and interface operations 440 are performed by the execution of software instructions using generalized hardware (or a combination of generalized hardware and dedicated hardware). In this case, the processing circuitry 404 retrieves video processing instructions 424, encoding/decoding instructions 426, and/or interface instructions 430 from memory 406. The processing circuitry 404 executes these various instructions 424, 426, and/or 428 to perform the indicated functions. Execution of the interface instructions causes the wireless device 400 to interface with the video processing system to performed operations described with reference to FIGS. 1-3 and 6-7. The memory 406 may also serve as a decoder buffer 430 with memory allocated therefore. Processing circuitry 404 may include one or more processing devices such as microprocessors, digital signal processors, application specific processors, or other processing type devices. Memory 406 may be any type of digital memory, volatile, or non-volatile, capable of storing digital information such as RAM, ROM, hard disk drive, Flash RAM, Flash ROM, optical drive, or other type of digital memory.

Generally, the wireless device 400 receives a video stream (video/audio stream) that is carried by data packets via the network interface 408 and processes the received video stream. Further, the wireless device 400, in some operations, receives other information from, and provides information to, a video processing device via interaction therewith that alters operations relating to the transport or processing of the video stream and/or the allocation of resources within the wireless device 400 for servicing of the video stream. In still other operations, the wireless device 400 may output a video stream within data packets via network interface 408 to another device. The network interface 408 supports one or more of WWAN, WLAN, and cellular wireless communications. Thus, the wireless interface 408, in cooperation with the processing circuitry 404 and memory supports the standardized communication protocol operations in most embodiments that have been previously described herein.

Figure 5:
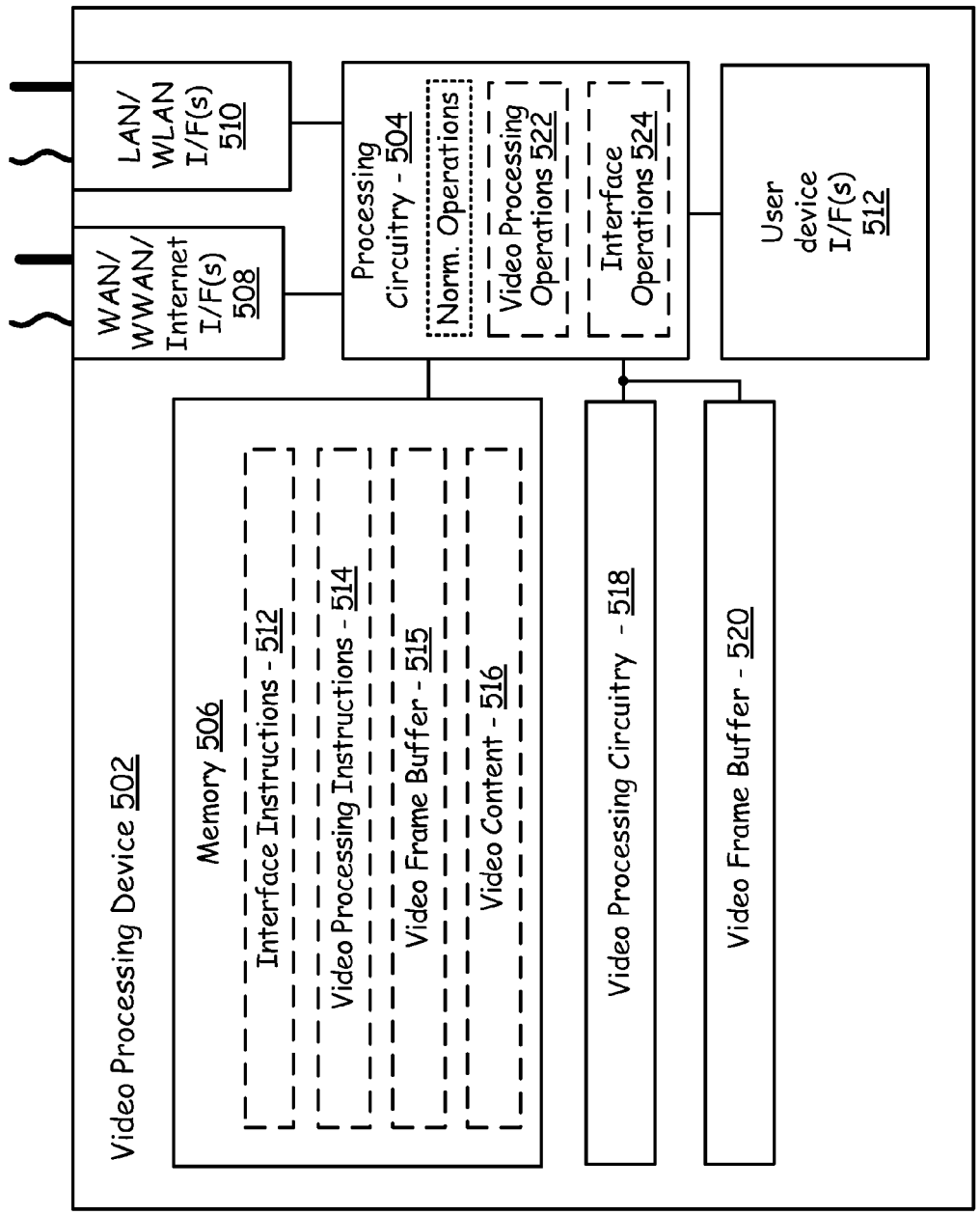
FIG. 5 is a block diagram illustrating a video processing system constructed and operating according to at least one embodiment of the present invention.

FIG. 5 is a block diagram illustrating a video processing system constructed and operating according to at least one embodiment of the present invention. The video processing system 502 may correspond to one of devices 314, 316, or 328, video sources 100A, 100B, 102A, 208A, and/or 208B, and/or any of the video processing systems 106A, 106B, 206A, 206B, 206C, or 206D of FIG. 3. The video processing system 502 includes processing circuitry 504, memory 506, network interfaces 508 and 510, user device interfaces 512, and may include video processing circuitry 518 and a video frame buffer 520. The processing circuitry 504 may include one or more processing devices such as microprocessors, digital signal processors, application specific processors, or other processing type devices. Memory 506 may be any type of digital memory, volatile, or non-volatile, capable of storing digital information such as RAM, ROM, hard disk drive, Flash RAM, Flash ROM, optical drive, or other type of digital memory. The first network interface 508 supports WAN/WWAN/Internet interface operations while the second network interface 510 supports LAN and WLAN interface operations. Of course, in differing embodiments a single network interface may service all necessary communication interface operations and in still other embodiments, additional network interfaces may be employed.

The video processing system 502 performs the video processing system operations previously described with reference to FIGS. 1-3 and that will be further described herein with reference to FIGS. 6-7. To accomplish these operations, the video processing system 502 includes processing circuitry 504, memory 506, first and second network interfaces 508 and 510, user device interface 512, and may include specialized circuitry. The specialized circuitry may include the video processing circuitry 518 and the video frame buffer 520. The operations of the video processing device 502 may also/otherwise be implemented by the processing circuitry 504. In such case, the processing circuitry 504, in addition to its normal operations, may perform video processing operations 522 and interface operations 524. In its operations, the processing circuitry 504 retrieves software instructions from memory and executes these software instructions, which include interface instructions 512 and video processing instructions 514. The memory 506 may include memory allocated as a video frame buffer 515 and may store video content 516.

Figure 6B:
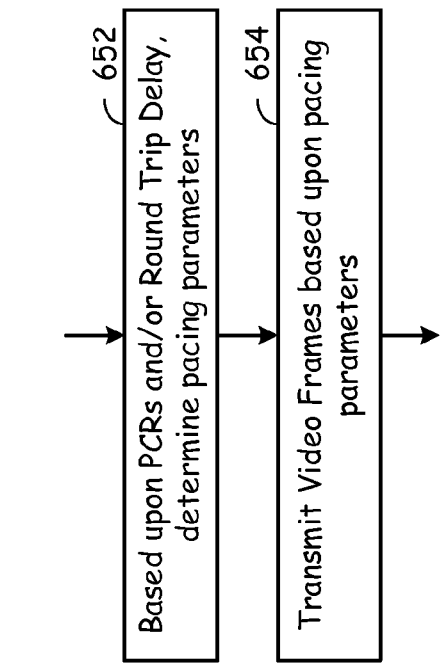
FIG. 6B is a flow chart illustrating operations for pacing transport of video frames based upon PCRs according to one or more embodiments of the present invention.
Figure 6A:
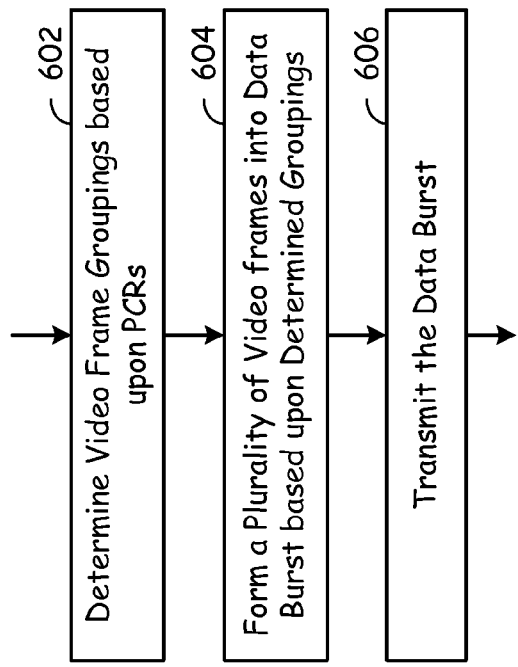
FIG. 6A is a flow chart illustrating operations for grouping video frames for transport using PCRs according to one or more embodiments of the present invention.

FIG. 6A is a flow chart illustrating operations for grouping video frames for transport using PCRs according to one or more embodiments of the present invention. In furtherance of the description of FIG. 1, one embodiment of determination of transmission parameters and transmitting video frames accordingly is described as operations 600. These operations 600 commence with the determining video frame groupings of video frames based upon the PCRs (Step 602). Determining video frame groupings may be based upon additional information as well such as available data throughput rate absent groupings, available throughput rate with groupings, RTD, and other considerations. Operations 600 continue with forming a plurality of video frames into a data burst based upon the determined video frame groupings (Step 604). Operations conclude with transmitting the data burst that includes the grouping of video frames (Step 606).

FIG. 6B is a flow chart illustrating operations for pacing transport of video frames based upon PCRs according to one or more embodiments of the present invention. Operations 650 of FIG. 6B commence with, based upon PCRs and/or roundtrip delay, determining pacing parameters (Step 652). Operation concludes with transmitting the video frames of the video stream based upon the pacing parameters (Step 654). As was previously described, in the transport of video frames of the video stream, transmission of such video frames should be made so as not to starve or overfill a decoder buffer of the remote wireless device. Thus, the operations 650 of FIG. 6B consider the goal of preventing starvation or overflow of the decoder buffer. By pacing the video frames according to the PCRs and/or RTD, decoder buffer starvation or overflow of the remote wireless device may be avoided.

FIG. 7A is a flow chart illustrating operations for pacing transport of video frames based upon a wireless device decoder buffer fullness according to one or more embodiments of the present invention. The operations 700 of FIG. 7A commence with the video processing system receiving an indication of a decoder buffer fullness of a serviced remote wireless device (Step 702). This indication may come in a control message or another message such as an acknowledgement from the remote wireless device. Then, operations 700 continue with pacing the transmission of video frames/or adjusting PCRs based upon the buffer fullness (Step 704). According to one particular embodiment of the present invention, the decoder buffer of the remote wireless device has a target fullness level. In order to attempt to meet this target buffer fullness level, the PCRs may be adjusted, the transmission of video frames may be paced, or a combination of both of these may be performed to meet the buffer fullness goal.

FIG. 7B is a flow chart illustrating operations for directing a wireless device to alter the size of its decoder buffer according to one or more embodiments of the present invention. The operations 750 of FIG. 7B are performed during transport of a video stream by a video processing system detecting that a serviced remote wireless device is experiencing/will experience a decoder buffer overflow event (Step 752). In response to detection of this remote wireless device decoder buffer overflow event, the transmitting device sends a message to the remote wireless device to direct the remote wireless device to increase its decoder buffer size (Step 754). In response to this direction, the remote wireless device will increase its decoder buffer size to avoid a decoder buffer overflow event.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for processing a video stream using Program Clock References (PCRs) contained in the video stream in preparation for transmission of the video stream to a wireless device, comprising:

receiving video frames of the video stream;

buffering the video frames;

extracting PCRs contained in the video frames of the video stream;

analyzing the PCRs to obtain characteristics of the video stream over time;

determining transmission parameters to transmit the video frames, in which the transmission parameters are determined by the analyzing of the PCRs and the obtained characteristics of the video stream;

determining a round trip delay, determined by a transmission of a packet to the wireless device and return of an acknowledgement of packet arrival from the wireless device, and wherein the transmission parameters are further based upon the round trip delay;
receiving an indication of a full decoder buffer of the wireless device;
pacing transmission of the video frames of the video stream by setting the transmission parameters based upon the indication of the full decoder buffer; and
transmitting the video frames of the video stream to the wireless device according to the transmission parameters.

2. The method of claim 1, wherein determining the transmission parameters and transmitting the video frames of the video stream to the wireless device according to the transmission parameters include:
determining video frame groupings based upon the analyzing of the PCRs;
forming a plurality of video frames into a data burst based upon the determined video frame groupings; and
transmitting the data burst.

3. The method of claim 1, wherein transmitting the video frames of the video stream to the wireless device according to the transmission parameters comprises pacing the transmission of the video frames of the video stream based upon an aging of the PCRs determined when analyzing the PCRs.

4. The method of claim 1, further comprising adjusting PCR times of the video frames of the video stream based upon the round trip delay.

5. The method of claim 1, further comprising:
Receiving, the indication of the full decoder buffer of the wireless device; and
directing the wireless device to adjust a size of the decoder buffer.

6. A video processing system that is operable to process a video stream using Program Clock References (PCRs) contained in the video stream in preparation for transmission of the video stream to a wireless device, the video processing system comprising:
a communications interface; and
processing circuitry coupled to the communications interface that, in cooperation with the communications interface, is operable to:
receive video frames of the video stream;
buffer the video frames;
extract PCRs contained in the video frames of the video stream;
analyze the PCRs to obtain characteristics of the video stream;
determine transmission parameters to transmit the video frames, in which the transmission parameters are determined by the analyzing of the PCRs and the obtained characteristics of the video stream;
determine a round trip delay, determined by a transmission of a packet to the wireless device and return of an acknowledgment of packet arrival from the wireless device;
determine the transmission parameters based upon the round trip delay;
receive an indication of a full decoder buffer of the wireless device;
pace transmission of the video frames of the video stream by setting the transmission parameters based upon the indication of the full decoder buffer; and
transmit the video frames of the video stream to the wireless device according to the transmission parameters.

7. The video processing system of claim 6, wherein to determine the transmission parameters and to transmit the video frames of the video stream to the wireless device according to the transmission parameters, the processing circuitry in cooperation with the communications interface is operable to:
determine video frame groupings based upon the analyzed PCRs;
form a plurality of video frames into a data burst based upon the determined video frame groupings; and
transmit the data burst.

8. The video processing system of claim 6, wherein to transmit the video frames of the video stream to the wireless device according to the transmission parameters, the processing circuitry in cooperation with the communications interface is operable to pace the transmission of the video frames of the video stream based upon an aging of the PCRs determined when the PCRs are analyzed.

9. The video processing system of claim 6, wherein the processing circuitry in cooperation with the communications interface is further operable to adjust PCR times of the video frames of the video stream based upon the round trip delay.

10. The video processing system of claim 6, wherein the processing circuitry in cooperation with the communications interface is operable to:
receive the indication of the full decoder buffer of the wireless device; and
direct the wireless device to adjust a size of the decoder buffer.

11. A method for processing a video stream using Program Clock References (PCRs) contained in the video stream in preparation for transmission of the video stream to a wireless device, comprising:
receiving video frames of the video stream;
buffering the video frames;
extracting PCRs contained in the video frames the video stream;
determining a round trip delay, determined by a transmission of a packet to the wireless device and return of an acknowledgement of packet arrival from the wireless device;
adjusting PCR times of the video frames of the video stream based upon the round trip delay;
receiving an indication of a full decoder buffer of the wireless device;
pacing transmission of the video frames of the video stream by adjusting the PCR times based upon the indication of the full decoder buffer; and
transmitting the video frames of the video stream to the wireless device with time adjusted PCRs.

12. The method of claim 11, further comprising:
receiving the indication of the full decoder buffer of the wireless device; and
directing the wireless device to adjust a size of the decoder buffer.

13. A video processing system that is operable to process a video stream using Program Clock References (PCRs) contained in the video stream in preparation for transmission of the video stream to a wireless device, the video processing system comprising:
a communications interface; and
processing circuitry coupled to the communications interface that, in cooperation with the communications interface, is operable to:
receive video frames of the video stream;
buffer the video frames;
extract PCRs contained in the video frames of the video stream;

determine a round trip delay, determined by a transmission of a packet to the wireless device and return of an acknowledgement of packet arrival from the wireless device;

adjust PCR times of the video frames of the video stream based upon the round trip delay;

receive an indication of a full decoder buffer of the wireless device;

pace transmission of the video frames of the video stream by adjusting the PCR times based upon the indication of the full decoder buffer; and transmit the video frames of the video stream to the wireless device with time adjusted PCRs.

14. The video processing system of claim 13, wherein the processing circuitry in cooperation with the communications interface is further operable to:

receive the indication of the full decoder buffer of the wireless device; and direct the wireless device to adjust a size of the decoder buffer.

* * * * *